Aug. 11, 1970  D. A. MATZEN ETAL  3,523,456
LIQUID LEVEL INDICATOR FOR A DISPENSER
Filed May 28, 1968  2 Sheets-Sheet 1
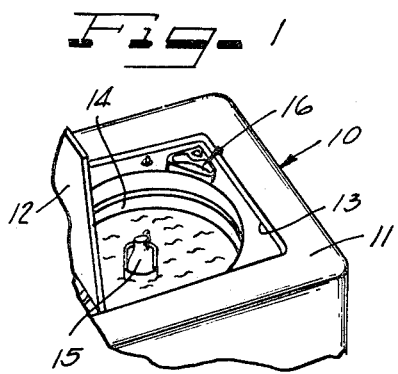
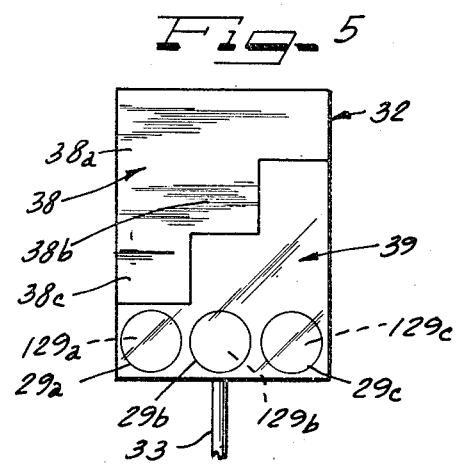
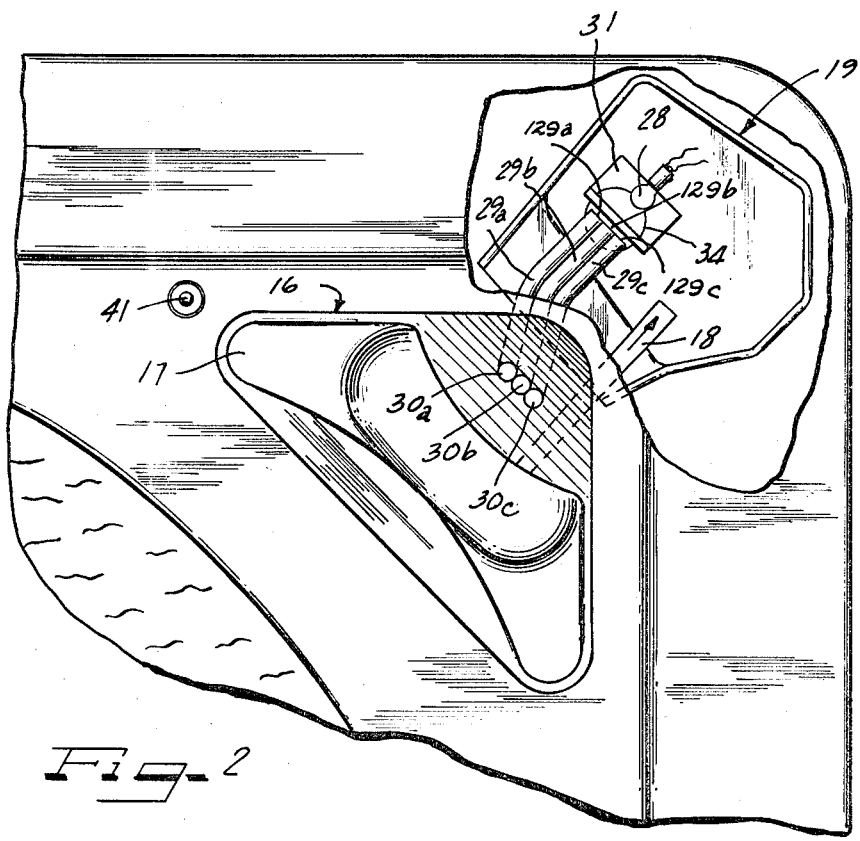
INVENTORS
DAVID A. MATZEN
JOHN D. SIEBLER
BY  ATTORNEYS

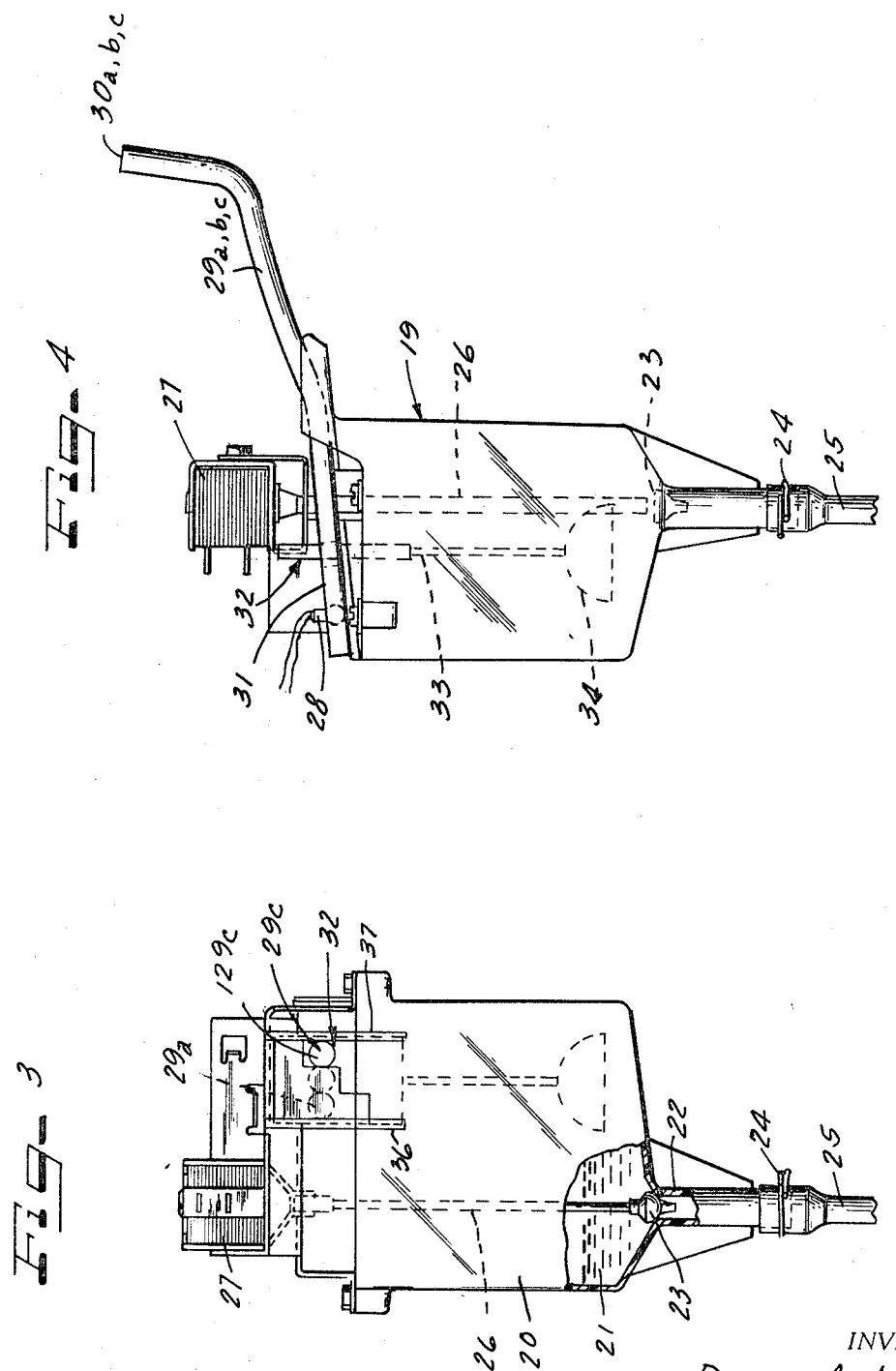

United States Patent Office 3,523,456
Patented Aug. 11, 1970

3,523,456
LIQUID LEVEL INDICATOR FOR A DISPENSER
David A. Matzen, St. Joseph, and John D. Siebler, Sawyer, Mich., assignors to Whirlpool Corporation, Benton Harbor, Mich., a corporation of Delaware
Filed May 28, 1968, Ser. No. 732,694
Int. Cl. G01f 23/10
U.S. Cl. 73—313                 5 Claims

ABSTRACT OF THE DISCLOSURE

A liquid level indicating means for use in conjunction with liquid dispensers, including a plurality of light transmitting rods positioned in a liquid reservoir, a light source positioned in the reservoir in spaced relation to the ends of the rods, a float arranged to float on the liquid contained in the reservoir, and a shutter carried by the float and positioned to intercept the light passing between the light source and the ends of the rods, the shutter serving to control the amount of light passing between the source and certain ones of the rods, thereby giving a visual indication of the relative position of the float in the liquid reservoir.

BACKGROUND OF THE INVENTION

Field of the invention

This invention is in the field of float operated liquid level indicating systems wherein the float has associated with it a shutter which determines the amount of light passing between a light source and a receptor element consisting of a plurality of light transmitting rods, the ends of the rods being positioned to give a visual indication of the relative position of the float in the reservoir, depending upon the extent to which the rods are illuminated.

Description of the prior art

Liquid level indicating systems employing light transmitting rods have been previously suggested in the prior art. For example, Vasel Pat. No. 3,120,125 describes a liquid level determining device employing a plurality of prisms associated with bundles of light conducting fibers so that when a given prism is immersed in a liquid having an index of refraction equal to that of the material of the prism itself, the light is not reflected from the prism but passes into the liquid. The condition of reflectance or non-reflectance of the impinging rays, depending on whether or not a given prism is immersed in the liquid is used to actuate an indicating system with the light conducting fibers serving as the conduits for light transmission.

Pribonic Pat. No. 3,272,174 describes a remote level indicator also utilizing light transmitting fibers. The arrangement is such that the fibers are positioned in the tank with different fiber lengths. Each individual fiber is subject to illumination from a light source unless the particular fiber is submerged and shield. Thus, the relative number of fibers which transmit light is used as an indication of the level of liquid in the tank.

SUMMARY OF THE INVENTION

The present invention provides a liquid level indicating system particularly arranged for use in laundry equipment wherein it is desired to provide an immediate indication, for example, of the level of liquid bleach contained in the bleach dispenser reservoir. The indicating system of the present invention gives a positive indication of the level within the dispenser, preventing the user from overfilling the dispenser and creating a high concentration of bleach in the laundry liquid. Furthermore, the indicating system of the present invention makes it no longer necessary for the user to pre-measure the amount of bleach placed in the bleach dispenser prior to the main washing cycle.

The liquid level indicating system of the present invention employs a light source in the reservoir which is arranged to illuminate the ends of a plurality of light transmitting rods arranged in side-by-side relation. The light source is preferably embedded in a light diffuser which distributes the light evenly across the end faces of the light transmitting rods. Between the light diffuser and the aforementioned ends of the rods, there is positioned a mechanical float which rides on the surface of the liquid contained in the reservoir. The float carries a shutter containing some opaque and some clear areas arranged so that as the float rides higher and higher in the reservoir, more clear and less opaque areas are exposed between the light source and the ends of the rods so that progressively more rods have their end faces illuminated. The opposite ends of the rods are displayed in a convenient location on the washing machine and serve to provide an immediate visual indication of the relative amount of liquid contained in the reservoir.

BRIEF DESCRIPTION OF THE DRAWINGS

FIG. 1 is a fragmentary view in perspective of a washing machine with its lid open to illustrate the general organization of the present invention;

FIG. 2 is a fragmentary plan view of the washing machine assembly on a larger scale than FIG. 1, with portions thereof broken away to illustrate the construction more clearly;

FIG. 3 is a front elevational view, partly broken away, of the reservoir and float assembly;

FIG. 4 is a side elevational view of the assembly shown in FIG. 3; and

FIG. 5 is a view in elevation of the shutter assembly.

DESCRIPTION OF THE PREFERRED EMBODIMENTS

The present invention will be described in conjunction with a bleach dispenser for a washing machine, but it should be evident that the liquid level indicator described herein will have utility for other types of installations where it is desired to monitor a liquid level from a remote location.

In the showing of FIG. 1, reference numeral 10 has been applied generally to an automatic washing machine having a top 11 on which there is fixed a hingedly supported door 12. The door 12, when closed, is received within a well 13 formed on the top 11. The fabrics to be laundered are disposed in a rotatable perforate basket 14 and the laundry liquid is agitated therein by means of a centrally disposed agitator 15. A bleach dispenser generally indicated at reference numeral 16 is conveniently located in a corner of the well 13.

With reference to FIG. 2, the bleach dispenser shown therein includes a funnel shaped opening 17 into which the liquid bleach is poured. A tube 18 delivers the liquid bleach from the funnel shaped opening 17 into a bleach reservoir generally indicated at numeral 19. The structure of this reservoir is best illustrated in FIGS. 3 and 4 of the drawings from which it will be seen that the reservoir includes a container 20 containing liquid bleach 21 and having a discharge conduit 22 at the bottom thereof. A ball-type valve 23 is positioned to control discharge of liquid bleach into the discharge conduit 22. The latter is connected by means of a hose connector 24 to a hose 25 which delivers the liquid bleach into the washing liquid contained in the tub. The valve 23 is supported on the rod 26 which in turn is actuated by a relay 27 to raise and lower the valve 23 either by closing of a suitable switch (not shown) or automatically as part of the timed washing cycle.

Referring back to FIG. 2, mounted in the reservoir 19 is a light source such as a light bulb 28 which is used to illuminate the ends of a plurality of light transmitting bars 29a, 29b and 29c each composed of either a single rod of light conducting material such as glass or lucite, or alternatively, a plurality of elongated light conducting fibers bundled and fused in accordance with known principles of fiber optics. As best illustrated in FIGS. 2 and 4, the light transmitting rods 29a through 29c are disposed in side-by-side relation and are suitably bent so that their upper ends form light projecting faces as at 30a, 30b and 30c which are flush with the surface of the well 13 and provide a visual indication of the amount of liquid in the reservoir. At the opposite end, the rods 29a, 29b and 29c are formed with light receiving faces 129a, 129b and 129c. It will be understood that if fiber optic means are provided, the respective end faces may be optically finished to enhance the light conductivity thereof. In order to diffuse the light from the bulb 28 or more evenly across the light receiving fibers 129a, 129b and 129c of the light transmitting rods 29a through 29c, the bulb 28 may be confined within a light diffuser 31 which spreads the light evenly across the ends of the tubes.

Disposed intermediate the light diffuser block 31 and the ends of the tubes 29a through 29c is a shutter 32 supported on a rod 33 and having a float 34 arranged to ride on the surface of the liquid bleach 21 in the reservoir. The shutter 32 is confined to a strictly vertical motion by means of slide channels 36 and 37, the channels having slots therein which accommodate sliding motion of the shutter 32, but prevent tilting or rotative motion of the shutter.

The configuration of the shutter itself is best illustrated in FIG. 5 of the drawings. The shutter may be composed of a transparent plastic material having an opaque area 38 and a clear, transparent area 39. In the configuration shown in FIG. 5, the opaque area 38 is divided into a rectangular area 38a extending the full width of the shutter, a rectangular area 38b extending approximately two-thirds of the width of the shutter, and a rectangular area 38c extending approximately one-third of the width of the shutter. Thus, as the shutter 32 moves upwardly in response to a rising level of liquid in the reservoir, the ends of the light transmitting bars 29a through 29c are progressively exposed to the clear area, and a visual indication of light transmission will be apparent at the exposed ends 30a through 30c of the bars.

The bulb 28 is energized only when the lid 12 is open. For this purpose, the assembly may include a normally closed switch 41 of the type employed in refrigerator doors and the like, so that upon opening of the door 12, the switch 41 closes and energizes the light bulb 28. Alternatively, a suitable switch means such as a mercury switch can be employed on the door 12 itself so that it closes when the door is opened and energizes the light bulb 28.

The operation of the device should be evident from the foregoing description. Assuming that the reservoir 19 is empty, the shutter 32 will be at its lowermost position so that the portion 38a of the shutter will be interposed between the ends of the light transmitting rods 29a, 29b and 29c. Since this area of the shutter is opaque, there will be no light transmitted to the opposite ends 30a, 30b and 30c of the light transmitting rods and the operator knows that the reservoir needs filling. Upon adding the liquid additive to the reservoir through the conduit 18, the float begins to rise and eventually the liquid level is high enough so that the rectangular area 38b of the shutter 32 is aligned with the rods 29a, 29b and 29c, and light will be transmitted through the rod 29c, giving a visible indication at the exposed end 30c of the rod. The operator then knows that the reservoir is substantially one-third full. As more and more liquid additive is added, the light will be transmitted through the succeeding ones of the rods until finally the clear area of the shutter will be interposed between the light source 28 and the ends of the rods, as illustrated in FIG. 5, whereupon all of the rods will have light transmitted through them, and the operator knows that the reservoir is substantially full of liquid.

From the foregoing, it will be understood that the liquid level indicating system of the present invention gives a positive indication of the level within a liquid dispenser, thereby avoiding the possibility of overfilling the dispenser and creating a high concentration of additive.

It should be evident that various modifications can be made to the described embodiments without departing from the scope of the present invention.

The embodiments of the invention in which an exclusive property or privilege is claimed are defined as follows:

1. A liquid level indicating ssytem for an inaccessible reservoir comprising,
   a plurality of light conducting rods having light receiving end faces adjacent the top of said reservoir, said rods being arranged in a horizontal side-by-side relation,
   a light source positioned in spaced adjacent relation to said end faces,
   a float arranged to float on the liquid contained in said reservoir, and
   a shutter carried by said float and vertically reciprocable in unison therewith, said shutter being positioned to intercept the light passing between said source and said end faces of said rods,
      said shutter having opaque and transparent portions thereon arranged to control the light passing between said source and selected ones of said rods depending upon the level of said float in said reservoir, said transparent portion being formed as a vertically stepped area at the bottom portion of the shutter, aligned with said light receiving faces, said rows having visible light projecting faces remote from said reservoir to which the light is selectively conducted to indicate the amount of liquid in the reservoir.

2. A washing machine comprising
   a casing,
   means in said casing forming a washing zone and comprising a tube into which laundry liquid and liquid washing additives are selectively charged, and
   a liquid additive dispenser in said casing arranged to introduce said additive into said tube comprising
      a reservoir for said additive,
      a plurality of light rods having light receiving faces adjacent the top of said reservoir, said faces being in horizontal side-by-side relationship,
      a light source positioned adjacent said faces at the ends of said rods,
      a float arranged to float on the liquid in said reservoir, a shutter carried by said float and extending between said faces of said rods and said light source and adapted to reciprocate vertically in unison with said float, said shutter having opaque and transparent portions thereon arranged to control the light passing between said source and selected ones of said rods depending on the level of said float in said reservoir, said transparent portion being formed as a vertically stepped area at the bottom portion of the shutter, aligned with said light receiving faces, a light projecting face on the other end of each of said rod, said reservoir, light source, float, shutter and light receiving faces being inaccessible to sight, and said light projecting face being disposed at an accessible location in said casing to which a visual indication of reservoir level is conducted.

3. The washing machine assembly of claim 2 and further characterized by said casing having a hinged door, and said light projecting faces of said rods are exposed to view when said door is in its open position.

4. The washing machine assembly of claim 3 and further characterized by circuit means including a switch for energizing said light source when said door is in its open position.

5. The washing machine assembly of claim 2 further characterized by light diffuser means positioned between said light source and said light receiving faces to distribute the light more uniformly across said faces.

References Cited

UNITED STATES PATENTS

| | | | |
|---|---|---|---|
| 1,461,722 | 7/1923 | Boyce | 73—322 X |
| 1,893,198 | 1/1933 | Corson | 73—322 |
| 2,194,625 | 3/1940 | Vermohlen | 73—293 |
| 2,616,941 | 11/1952 | Lasko. | |
| 3,384,885 | 5/1968 | Forbush | 340—380 X |
| 3,286,508 | 11/1966 | Spiegel | 350—96 X |
| 3,371,535 | 3/1968 | Martiniak | 73—322 X |

OTHER REFERENCES

Publication: "Optical Displacement Measuring Device," by Hamrick et al., IBM Tech. Disclosure Bulletin, vol. 4, No. 7, December 1961.

LOUIS R. PRINCE, Primary Examiner

D. M. YASICH, Assistant Examiner

U.S. Cl. X.R.

73—322; 340—380

UNITED STATES PATENT OFFICE
CERTIFICATE OF CORRECTION

Patent No. 3,523,456          Dated August 11, 1970

Inventor(s) David A. Matzen & John D. Siebler

It is certified that error appears in the above-identified patent and that said Letters Patent are hereby corrected as shown below:

Claim 1, line 1, "ssytem" should be --system--;

14, "a vertical guideway for said shutter" was omitted after "...said end faces of said rods,"

22, "rows" should be --rods--.

Claim 2, line 4, "tube" should be --tub--;

7, "tube" should be --tub--.

SIGNED AND SEALED
NOV 17 1970

(SEAL)
Attest:

Edward M. Fletcher, Jr.
Attesting Officer

WILLIAM E. SCHUYLER, JR.
Commissioner of Patents